United States Patent [19]

Huffman et al.

[11] 3,969,092

[45] July 13, 1976

[54] LIQUID DEGASSING DEVICE

[75] Inventors: John A. Huffman, Northridge; Vincent G. Magorien, Granada Hills, both of Calif.

[73] Assignee: Seaton-Wilson, Incorporated, Burbank, Calif.

[22] Filed: Jan. 10, 1974

[21] Appl. No.: 432,184

[52] U.S. Cl. .................................. 55/160; 55/164; 55/189
[51] Int. Cl.² ......................................... B01D 19/00
[58] Field of Search .................. 55/21, 55, 160, 166, 55/168, 189, 194

[56] References Cited
UNITED STATES PATENTS

| | | | |
|---|---|---|---|
| 3,273,313 | 9/1966 | Livesey et al. | 55/55 X |
| 3,358,424 | 12/1967 | Magorien | 55/168 |

*Primary Examiner*—Charles N. Hart
*Assistant Examiner*—Richard W. Burks
*Attorney, Agent, or Firm*—Fulwider Patton Rieber Lee & Utecht

[57] ABSTRACT

A device for separating dissolved or entrained gas from a liquid and particularly for separating dissolved or entrained air from oil used in hydraulic systems or as electrical insulation. Contaminated oil, containing dissolved or entrained gas, is introduced into a degassing chamber where the gas is removed in a relatively low pressure atmosphere. The oil, with at least part of the gas removed is withdrawn from the chamber through a cycling valve which automatically closes when the oil in the chamber reaches a low level at the end of a degassing phase. After the cycling valve closes, the degassing chamber begins to fill with oil, and the rising oil level operates as a piston to expel the previously separated gas through a vent. When the oil completely fills the chamber, the vent closes and pressure within the chamber rises until a predetermined pressure is reached. The cycling valve then opens automatically, allowing the oil to again be withdrawn. Provision is also made for removing large quantities of air from a system reservoir in one application of the invention by connecting the reservoir to the degassing chamber through a shuttle valve.

18 Claims, 10 Drawing Figures

U.S. Patent July 13, 1976 3,969,092
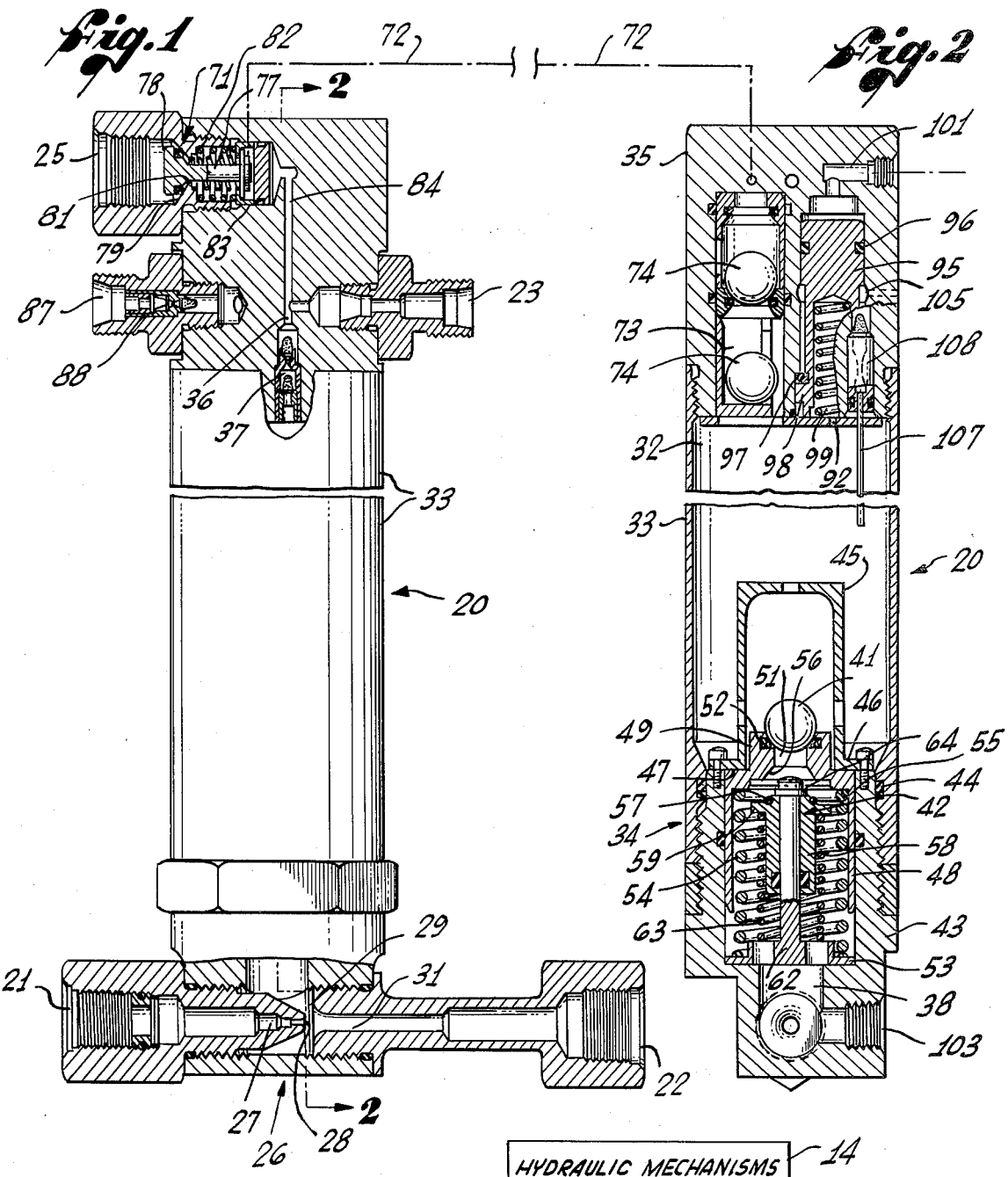
Fig. 1
Fig. 2
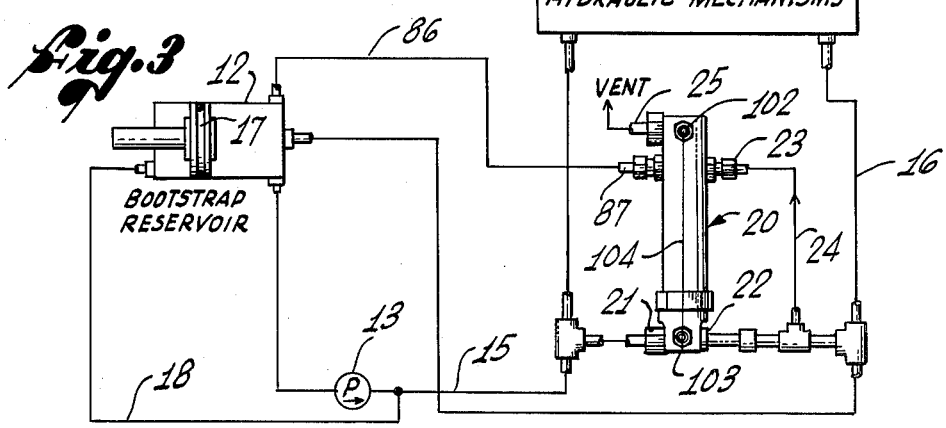
Fig. 3

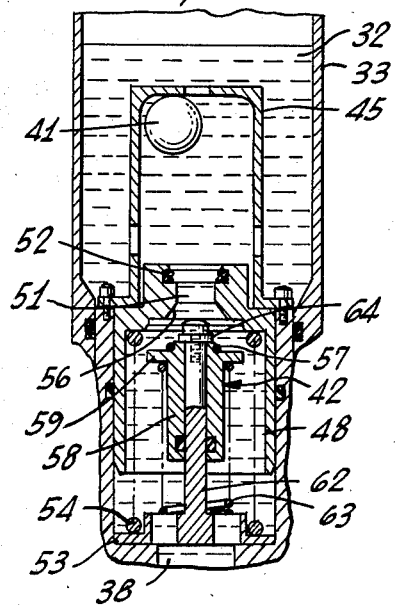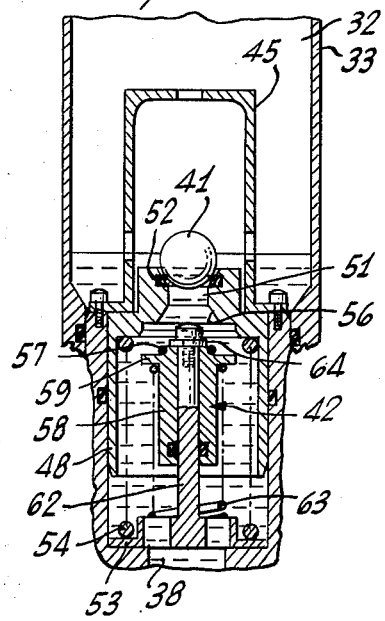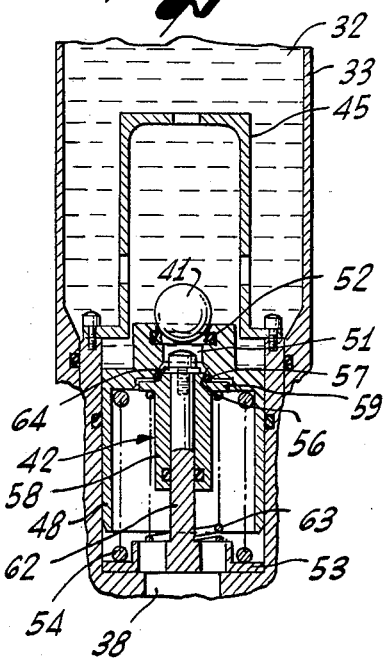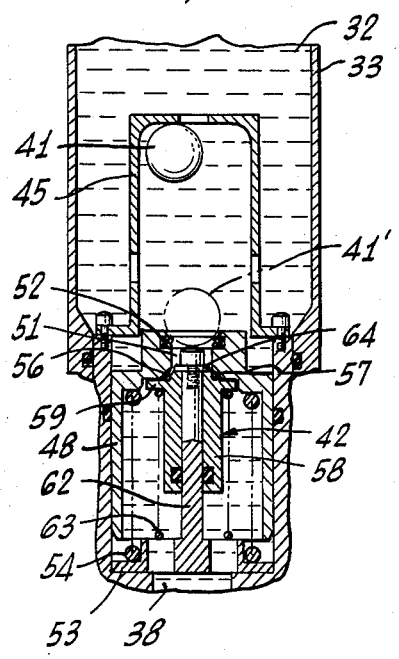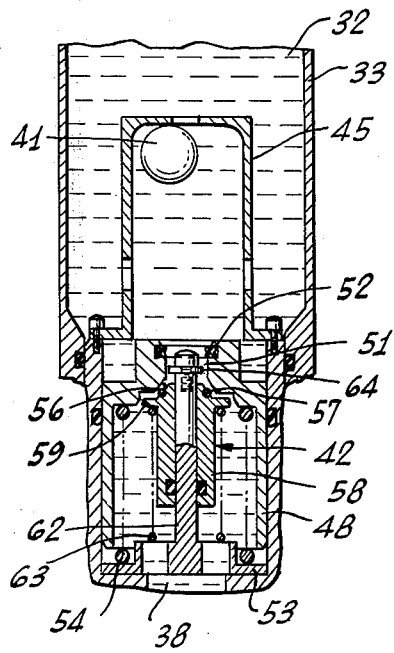

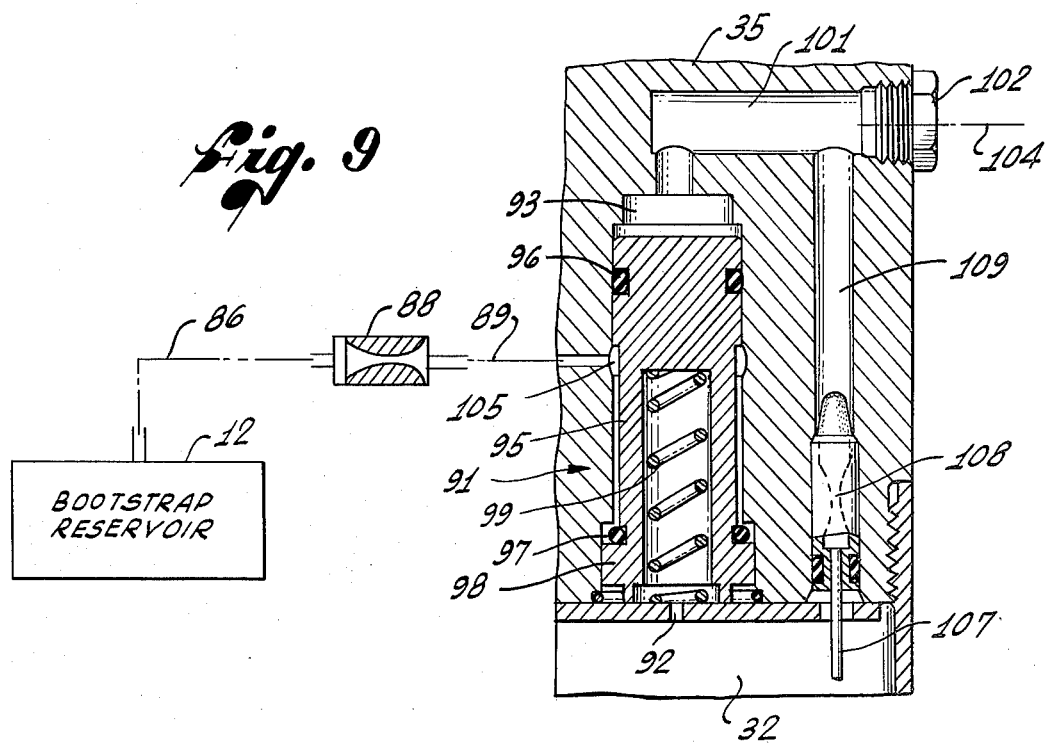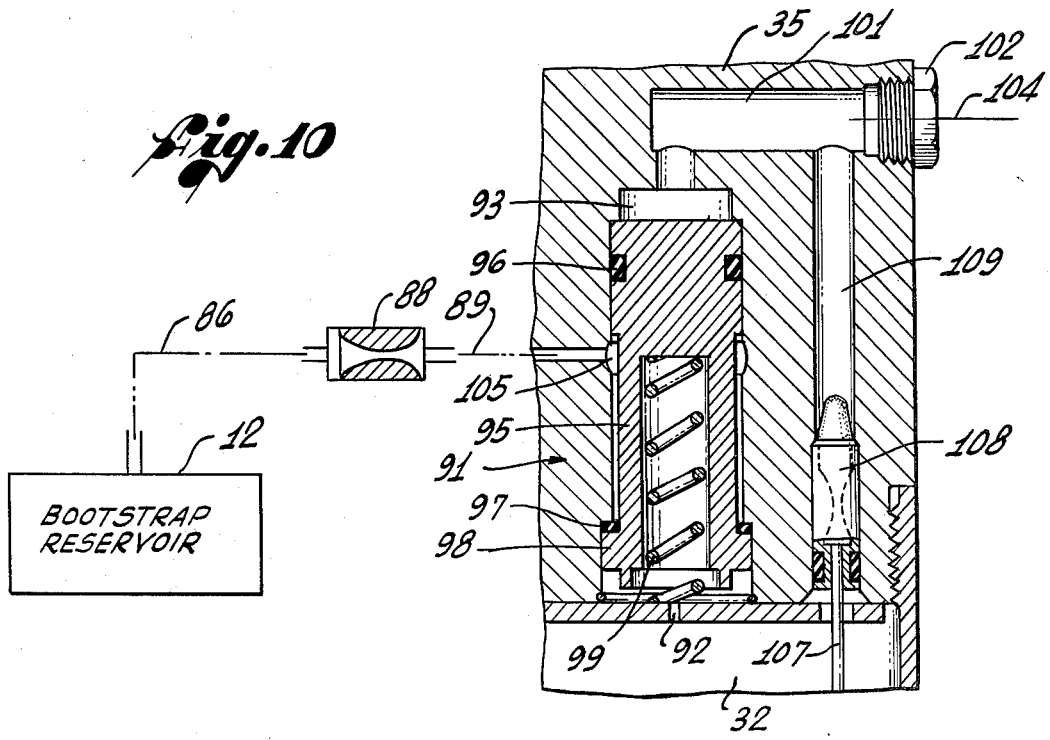

LIQUID DEGASSING DEVICE

BACKGROUND OF THE INVENTION

This invention relates generally to devices for separating dissolved or entrained gas from a liquid, and, more particularly, to devices for the separation of air from a working fluid used in hydraulic systems or from fluids used as insulators in electrical systems.

The working fluid in hydraulic systems, for example, typically absorbs or dissolves air readily through pressure seals and pumps suction lines, as well as during system flushing and filling. Air introduced by any means into such a system is dissolved or entrained in the oil, or it may find its way to various corners or "quiet spots" in the system. Clearly, any significant accumulation of air in a hydraulic system adversely affects various physical properties of the oil, and can result in sudden and often disastrous failure of hydraulically operated components. Such a problem in hydraulic systems is aggravated in aircraft applications by low pressures encountered in high altitude flight which cause any dissolved air to be released into the system from the hydraulic fluid.

Various devices have been developed to "degas" hydraulic or electrical insulation systems, many using a vacuum pump connected to a container of the fluid. Use of vacuum pumps is generally unsatisfactory for a number of reasons. For example, the fluid undergoing degassing tends to froth and to be drawn into the pump. Also, there are often substantial maintenance problems with vacuum pumps.

A significant advance in degassing devices occurred with the development of the "Gas-Oil Separator" which is the subject of U.S. Pat. No. 3,358,424 issued to Vincent G. Magorien and assigned to the same assignee as the present invention. The Magorien device includes no vacuum pumps and employs a cyclic degassing technique which overcomes many of the disadvantages of its predecessors. However, it was intended primarily for degassing aircraft hydraulic and other systems on the ground, and certain of its features make it unsuitable for use in airborne or industrial environments. For example, a large float is used to actuate a cycling valve in the device, but the buoyancy and weight forces of the float may be insufficient to operate the valve consistently when the device is subject to particle contamination, variations in oil viscosity, or changes in aircraft attitude.

There has long existed, therefore, a need for a fluid degassing device, without vacuum pumps and other hard-to-maintain components, which can operate continuously in an airborne or industrial environment which is subject to contaminating solid particles, variations in temperature and pressure, and rapid changes in attitude, including possible temporary inversion. A need also exists for an airborne degassing device which can remove relatively large quantities of trapped air from specific pockets in a hydraulic system, as well as smaller, entrained and dissolved amounts. For example, sealed reservoirs, called "bootstrap" reservoirs, are commonly used in modern aircraft for improved pressurization and inverted flight. However, they are susceptible to air entrapment, and an airborne degassing device should also provide for the removal of such large quantities of entrapped air. The present invention satisfies the foregoing requirements.

SUMMARY OF THE INVENTION

The present invention resides in a gas-liquid separator capable of continuous cyclic operation in an airborne or industrial environment for removing unwanted gas contained in the liquid. Basic to the present invention is a cycling valve for automatically controlling the flow of degassed liquid through an outlet from a degassing chamber in the device. In general terms, the cycling valve includes means for automatically closing the outlet when the liquid in the degassing chamber falls to certain level, and independent means for rapidly opening the outlet when a certain increased liquid pressure is reached when the chamber fills after the outlet is closed.

The cycling valve thus operates in a cyclic fashion to close the outlet when liquid level is low, and to reopen the outlet when the liquid level again reaches a high level and pressure in the degassing chamber increases. As in the device described in the previously mentioned patent to Margorien, the outlet from the degassing chamber is connected to an aspirator, which provides a region of low pressure in a stream of the liquid. This low pressure draws liquid through the outlet and into the stream, so long as the outlet is open, and tends to create a vacuum or region of lower relative pressure in the space above the liquid in the degassing chamber. Liquid containing dissolved and entrained gas is continuously sprayed into the space above the liquid at a rate somewhat less than the rate at which liquid is withdrawn by the aspirator. The gas is separated from the liquid quite readily because of the low pressure in the chamber, and accumulates in the space above the liquid as its level slowly falls. The cycling valve closes the outlet when the liquid falls to a low certain level, allowing the liquid level to rise in the degassing chamber and to compress the separated gas above it. A pressure operated vent opens momentarily to expel the gas, and the cycling valve reopens the outlet to begin another cycle when the liquid pressure in the chamber reaches a certain increased value.

More specifically, in a presently preferred embodiment of the invention used to degas hydraulic oil, the means for closing the outlet includes a float valve which is free to move within an open cage in the degassing chamber, and which, as the oil level falls, settles onto a seat to close the outlet. The means employed for opening the outlet includes, in the preferred embodiment, a relief valve which, under increasing oil pressure in the degassing chamber, seals the outlet at a point below the float seat. Further increase in pressure moves the float and its seat toward a stationary post which pushes the float off its seat. Finally, an additional increase in pressure "cracks" the relief valve and allows the pressure to be applied suddenly over a larger area of the relief valve, thus providing a positive opening of the outlet.

Because the present invention does not use a large float to open and close the outlet, it avoids problems such as float-valve sticking due to contamination, and changes in operational characteristics caused by variations in viscosity and temperature. Furthermore, the present device can easily withstand periods of inversion, such as in inverted aircraft flight, and begin degassing operations again as soon as the aircraft is righted.

In accordance with another aspect of the invention, a relatively large quantity of air, such as might accumulate in a sealed reservoir in an aircraft hydraulic system after someone has serviced a hydraulic component but has subsequently neglected to "bleed" air from the system, can be vented from the system without waiting for it to be absorbed into the oil and then gradually separated in the degassing device. A line connects the top of the sealed system reservoir with the top of the degassing chamber, and includes a narrow constriction in its length so that only a small amount of oil will be drawn from the resevoir into the degassing chamber. However, any air pocket in the reservoir will be rapidly drawn into the degassing chamber and vented along with the air separated in the degassing chamber.

In order to draw large quantities of air from the reservoir without overfilling the degassing chamber with air, a shuttle valve is included in the line, the valve closing automatically when the air in the degassing chamber reaches a certain pressure with respect to a reference pressure taken from the aspirator of the device. When the shuttle valve has closed, no further air is drawn from the reservoir until the next cycle of operation.

It will be appreciated from the foregoing that the present invention significantly advances the state of the art of degassing devices. In particular, the device is capable of operating reliably and automatically in an airborne or industrial environment, to separate air from oil in a hydraulic or electrical system without using mechanical vacuum pumps and other hard-to-maintain components. Furthermore, the device can quickly remove large quantities of air from the system as well as large quantities of entrained or dissolved air. Other aspects and advantages of the invention will become apparent from the following more detailed description taken in conjunction with the following drawings.

BRIEF DESCRIPTION OF THE DRAWINGS

FIG. 1 is an elevational view of an oil degassing device embodying features of the present invention and shown partly broken away and in section;

FIG. 2 is a sectional view of the device of FIG. 1, taken substantially along the line 2—2;

FIG. 3 is a diagrammatical representation of a hydraulic system in which the invention might be used;

FIGS. 4–8 are fragmentary sectional views of the cycling valve used in the invention, and together illustrate the mode of operation of the cycling valve;

FIG. 9 is an enlarged, fragmentary, sectional view of a shuttle valve as used in the invention to remove large quantities of air from a hydraulic system, with the shuttle valve shown in an open position and with connection to the hydraulic system shown diagrammatically; and FIG. 10 is a view similar to FIG. 10, with the shuttle valve shown in a closed position.

DETAILED DESCRIPTION

As shown in the drawings for purposes of illustration, the invention is particularly well suited for use in degassing or deaerating oil in a hydraulic system such as the one illustrated diagrammatically in FIG. 3. Typically, a hydraulic system includes an oil reservoir 12, a pump 13, and various hydraulically operated mechanisms 14. The pump is connected in a supply line 15 supplying high pressure oil to the hydraulically operated mechanisms 14, and a return line 16 returns low pressure oil from the mechanisms to the reservoir 12. The values of high and low oil pressures will depend on the type of system and its design, but typical values in aircraft hydraulic systems are 3,000 p.s.i. for the high pressure oil and 60 p.s.i. for the low pressure oil.

The illustrated reservoir 12 is a sealed reservoir of the so-called bootstrap type commonly used in modern aircraft. The reservoir 12 includes a movable piston 17, and, as usual in bootstrap reservoirs, high pressure oil is applied to one side of the piston over a line 18 from the pump 13.

In a hydraulic system such as the one illustrated, air is constantly being taken in by the hydraulic oil, for the most part through imperfect seals in the system. Also, dissolved air is released from the oil at points of low pressure in the system, and pockets of air may easily build up at "quiet spots". Substantial amounts of air in the system increases the likelihood of pump cavitation and adversely affect physical properties of the oil, such as heat conductivity, bulk modulus, and resistance to oxidation.

This invention is principally concerned with novel features of a degassing device 20 of the type that may be permanently connected to the hydraulic system to continually remove air from the oil. The degassing device 20 has a pressure port 21 connected to the supply line 15, a return port 22 connected to the low pressure return line 16, a degassing port 23 also connected to the low pressure side of the system, by a line 24, and a vent port 25 through which air separated from the oil is expelled.

Between the pressure port 21 and the return port 22 of the degassing device 20, there is an aspirator assembly 26, best shown in FIG. 1. Oil entering the pressure port 21 flows through a passage 27 which continually decreases in diameter in the direction of flow, through a narrow orifice 28 at the end of the passage, across a cavity 29, and into a throat 31 aligned with the orifice and connecting to the return port 22. The relatively high velocity of the oil through the orifice 28 produces a subatmospheric pressure in the cavity 29, the pressure rising again as the oil passes through the throat 31. A small, parasitic flow of oil to be degassed is drawn along the line 24 from the low pressure side of the device 20 and enters the degassing device through the degassing port 23. As will be described in detail, degassed oil is removed from the device 20 on a cyclic basis, through the cavity 29 and thence back into the hydraulic system through the return port 22. It will be apparent that a small proportion of degassed oil thus returned to the system will be again drawn along line 24 into the degassing device 20. As the device continues to operate, the amount of dissolved and entrained air in the system will be continually reduced until at least 90% of the dissolved air is removed.

As is best shown in FIGS. 1 and 2, the degassing device 20 of the type to which the present invention belongs basically comprises a degassing chamber 32, typically defined by the walls of a generally vertically oriented, elongated tube 33, with a cycling valve 34 attached to its lower end and a port housing 35 attached to its upper end. The size of the degassing chamber 32 will depend on the type and degassing needs of the hydraulic system. Its capacity may be a gallon or more, but will usually be less. The degassing port 23 is fitted into the port housing 35, and connects by a passage 36 with a jet assembly 37 whose purpose is to restrict the flow of oil to be degassed to a desired rate, and to disperse the oil into a fine spray as it enters the degassing chamber 32.

Oil flows from the degassing chamber 32 through the cycling valve 34 and into an outlet passage 38 which communicates with the cavity 29 in the aspirator assembly 26 in the lower end of the device 20. The aspirator assembly 26 and the jet assembly 37 are so designed that the flow of oil out of the degassing chamber 32 exceeds the flow in through the aspirator port 23. Thus, when the valve 34 is open, the oil level in the degassing chamber 32 will fall and will tend to leave a vacuum above itself. Air in the oil entering through the jet assembly 37 will be readily separated from the oil in this near vacuum, and will accumulate in the degassing chamber 32 at a relatively constant pressure, since any tendency for the pressure to increase will increase the flow through the outlet passage 38 and thereby lower the oil level in the chamber.

When the oil level in the degassing chamber drops to a low level, the valve 34 closes automatically and the level begins rising again since the flow in through the degassing port remains relatively constant. As the level rises, separated air above the oil is compressed and expelled through the vent port 25 when its pressure slightly exceeds the ambient pressure outside the device 20. Finally, the valve 34 closes again when the oil level nears the top of the degassing chamber 32, and the cycle begins again.

As mentioned previously, devices of this type that use a large float on the oil in the degassing chamber 32 to control operation of the cycling valve 34 are inherently unsuitable for airborne use, and are quite sensitive to contamination and to variations in the viscosity and temperature of the oil.

In accordance with the present invention, the valve 34 includes a small buoyant ball 41 to close the cycling valve, and an independent relief valve 42 to positively open the cycling valve when a certain pressure is reached. Because no large floats or moving parts are needed, the cycling valve 34 of the invention performs reliably in airborne or industrial environments and is a significant improvement over the prior art.

More specifically, the cycling valve 34 in a presently preferred embodiment of the invention includes a hollow, generally cyclindrical housing 43, threadably connected to the lower end of the tube 33 of the device 20 and sealed thereto with an O-ring pressure seal 44. A generally cylindrical, open cage 45, to retain the ball 41, is attached to the open upper end of the housing 43 by a flange 46 on the lower end of the cage. The cage 45 is somewhat smaller in diameter than the inside diameter of the housing 43, and the flange 46 therefore forms an annular shoulder 47 at the open upper end of the housing.

Slidably fitted inside the housing 43 is a hollow, cylindrical piston 48. The piston 48 has a short upper portion 49 of reduced diameter sized to easily fit inside the cage 45, this upper portion having a central hole 51 through it and a seat 52 in the form of a sealing ring fitted near the top of the hole to receive the ball 41. The housing 43 is closed at its lower end 53 except for the outlet passage 38 leading to the aspirator cavity 29, and a compression spring 54 bears on this lower end and on an internal shoulder 55 near the top of the piston 48, urging the piston into contact with the annular shoulder 47 formed by the flange 46 on the cage 45.

The lower end of the hole 51 through the upper portion of the piston 48 is beveled or chamfered to provide a seat 56 for a sealing ring 57 on the relief valve 42. The relief valve 42 includes a sleeve 58 with a flange 59 on its upper end, and is slidably fitted to a central post 62 integral with the lower end 53 of the housing 43. Another compression spring 63 bears upwardly on the flange 59 and urges the sleeve 59 against a stop 64 at the upper end of the post 62. The sealing ring 57 is fitted to the top of the flange 59, and, when both springs 54 and 63 are fully extended, the relief valve 42 is wide open, i.e. the sealing ring 57 is a substantial distance below its seat 56. The cycling valve 34 also includes two other sealing rings 65 and 66, between the piston 48 and the housing 43, and between the sleeve 58 and the post 62, respectively.

Operation of the cycling valve 34 can best be described with reference to FIGS. 4–8. During what can be designated a degassing phase, the cycling valve 34 is open, as illustrated in FIG. 4, the oil level is falling, and the ball 41 is buoyed to the top of the cage 45. In this phase, oil is drawn through the hole 51, through the open relief valve 42, and on through the outlet passage 38. This flow is positively checked when the level falls sufficiently for the ball 41 to reach its seat 52, as shown in FIG. 5. Once seated, the ball 41 is held by the vacuum still existing below it in the aspirator cavity 38, and by gradually increasing pressure above it as the degassing chamber 32 begins to fill with oil again to start a venting phase.

During the venting phase, the rising oil level compresses the separated gas slightly and forces it through the venting port 25 (FIGS. 1 and 2), which automatically closes when the oil level reaches it. Then, the pressure at the bottom of the degassing chamber 32 increases, and the ball 41 and the piston 48 are pushed downwardly against the spring 54 until the relief valve seat 56 contacts the sealing ring 57 of the relief valve, as shown in FIG. 6. Flow through the cycling valve 34 is at this point closed off by both the ball 41 and the relief valve 42.

Further increases in pressure in the degassing chamber 32 moves the ball 41, piston 48, and sleeve 58 all bodily downwards until the end of the post 62 pushes upwardly on the ball, and breaks it from its seat 52, as shown at 41' in FIG. 7. With the pressure beneath the ball 41 equalized with the pressure above it, the ball floats to the top of the cage 45.

The springs 54 and 63 are so selected that still further increase in pressure moves both the piston 48 and the sleeve 58 of the relief valve 42 together, until the pressure becomes high enough to crack the relief valve 42, as shown in FIG. 8. When this occurs, the high oil pressure in the degassing chamber 32 is transferred to the flange 59 on the sleeve 58 of the relief valve 42, and a larger force is thereby suddenly applied to the relief valve to open it rapidly. With the relief valve 42 fully open, the pressure in the degassing chamber 32 quickly falls, and the springs 54 and 63 return the piston 48 and sleeve 58 to their original positions, as shown in FIG. 4, leaving the cycling valve 34 open for the next degassing phase.

The complete cycle time will depend on various design choices concerning the component sizes, and will also vary according to the amount of gas entrained and dissolved in the oil, since a smaller concentration of gas will result in a longer degassing phase. Typically, the cycle time will be in the range of 30 seconds to 3 minutes.

Venting the separated air from the degassing chamber 32 may be accomplished by any of a number of different means. Venting apparatus in the presently preferred embodiment includes a check valve 71 (FIG. 1) at the vent port 25, designed to open when the air pressure in the degasssing chamber exceeds the ambient pressure by some small amount, such as 0.5 p.s.i. The check valve 71 is connected through a passage, shown diagrammatically at 72 (FIGS. 1 and 2), in the port housing 35 to a generally cylindrical chamber 73 opening into the degassing chamber 32. Inside the cylindrical chamber 73, is an arrangement of two balls 74a and 74b, and two sealing rings 75a and 75b. The upper sealing ring 75a serves as a seat for the upper ball 74a and seals the passage 72. The lower sealing ring 75b is located between the balls 74a and 75b, and serves as a seat for either, but not both balls, An air pressure slightly above atmospheric will lift the upper ball 74a from the lower sealing ring 75b and allow the air through to the check valve 71, but a rising oil level will force at least one of the balls upwards against a corresponding one of the sealing rings 75a and 75b, and prevent significant amounts of oil from escaping. Upon reapplication of vacuum, the upper ball 74a will drive the lower ball 74 b off the lower sealing ring 75b, sealing the degassing chamber 32, as shown in FIG. 2.

The check valve 71 (FIG. 1) in the preferred embodiment includes a valve stem 77, a valve seal 78, a valve seat 79, and a spring 81. Also included is another spring 82 and a valve override piston 83 which together act to hold the valve closed and prevent leakage if pressure is ever lost at the degassing port 23. A passage 84 communicates pressure from the degassing port 23 to the override piston 83 and compresses the spring 82 to allow the check valve 71 to operate normally.

It will be apparent that, if the device 20 is inverted, the lower ball 74b will be moved by the oil flow around it, and seated on the lower sealing ring 75b. The vent port 25 will thus be effectively closed, even if venting was in progress at the time of inversion. If degassing was in progress, with the cycling valve 34 open, some air may be drawn into the aspirator stream during inversion, but this would be only the amount of air separated during the current degassing phase. When the device 20 is returned to its normal, non-inverted position, venting or degassing will resume automatically.

In accordance with another aspect of the invention, relatively large quantities of air in the sealed reservoir 12 (FIG. 3), or elsewhere in the system, can be removed quickly without waiting for them to be absorbed in the oil and then separating them in the degassing chamber 32. A line 86 (FIG. 3) connects the top of the reservoir 12 with a reservoir bleed port 87 on the port housing 35. Included in the reservoir bleed port 87 is another jet assembly 88 to restrict flow through the port, and, as best shown in FIGS. 9 and 10, a passage 89 connects the port to the degassing chamber 32 through a shuttle valve 91.

When no air is present in the reservoir 12, an insignificant amount of oil will be drawn from the reservoir into the degassing chamber 32 along lines 87 and 89, and through the normally open shuttle valve 91. When air is present in the reservoir 12, it will be quickly drawn into the degassing chamber 32 along the same path, and vented in the usual way during the next venting phase.

If a very large quantity of air has to be removed from the reservoir 12, the air in the degassing chamber 32 would quickly become pressurized by the incoming air from the reservoir. If sufficient air entered the degassing chamber 32 in this manner, the increased pressure in the chamber would cause the balls 74a and 74b to seat on the sealing rings 75a and 75b, thereby sealing the degassing chamber and preventing venting. The degassing device 20 would then "stall out" if the next degassing phase could not create sufficient vacuum to lower the balls 74a and 74b to their normal position during degassing. The shuttle valve 91 overcomes this problem by shutting off air from the reservoir 12 when pressure applied to close the valve increases because of an increased flow of air to the degassing chamber 32 through an orifice 92.

More particularly, the shuttle valve 91 in the presently preferred embodiment of the invention includes a generally cylindrical chamber 93, in which a generally cylindrical shuttle 94 is slidably fitted. An upper sealing ring 96 forms a seal between the shuttle 95 and the walls of the chamber 93 near the upper end of the chamber. A lower sealing ring 97, of slightly larger diameter than the upper sealing ring 96, is located on a lower flange 98 of the shuttle 95 and forms a seal between the shuttle and an internal shoulder of the chamber 93 when the shuttle is urged upwardly, as shown in FIG. 11. A light compression spring 99 urges the shuttle 95 upwardly in the chamber 93, and a reference vacuum pressure is applied above the shuttle 95 through a passage 101 connected with a reference port 102 on the port housing 35. The reference pressure is obtained from an aspirator port 103 (FIG. 2) connected with the aspirator cavity 28 (FIG. 1), and is communicated to the reference port 102 by line 104.

Air enters the shuttle valve 91 from line 89 through a circumferential groove 105 in the shuttle chamber 93, located between the upper sealing ring 96 and lower sealing ring 97. Since the lower sealing ring 97 is the larger one, a net downward force is exerted on the shuttle 95 by the incoming air, and this force is just sufficient to overcome the force of the spring 99, and to move the shuttle downwardly, if the pressure above and below the shuttle are equal. Thus, the valve will open if the pressure in the degassing chamber 32 is equal to or less than the reference pressure applied above the shuttle 95.

In the open position shown in FIG. 10, air flows around the lower sealing ring 97 and through the orifice 92 to the degassing chamber 32. The orifice 92 acts as a metering device for the air entering the degassing chamber 32. A large flow raises the pressure upstream of the orifice 92 and causes the shuttle 95 to move upwardly to shut off the flow until the upstream pressure falls off again. The orifice 92 makes the shuttle valve 91 extremely sensitive to air flow, and acts rapidly to close off excessive air flow which would otherwise stall out the degassing device.

As an additional precaution against stalling out of the device when excessive air is drawn in from the reservoir 12, a long stem 107 is provided to aspirate excessive air from the degassing chamber 32, thereby allowing normal degassing to continue. The stem 107 extends downwardly from the port housing 35 to a point very close to the cage 45 (FIG. 2), and is connected through a small orifice 108 to a passage 109 communicating with the reference port 102. So long as the end of the stem 107 is immersed in oil, as is normally the case, the orifice 108 will restrict the oil flow in the stem to an insignificant amount. However, if a large quantity of high pressure air is present in the degassing chamber 32, it will be drawn out through the stem 107 and into the aspirator assembly 26 (FIG. 1). Thus, although the air removed in this way will have to be subsequently separated from the oil, stalling out of the device is avoided.

It will be appreciated from the foregoing that the present invention significantly advances the state of the art of liquid degassing devices. In particular, the invention operates reliably to continually degas hydraulic systems in airborne or industrial environments, and is not sensitive to contamination of the oil or to variation in viscosity or temperature. Additionally, it can operate to rapidly remove large quantities of air from the system before they become dissolved or entrained.

While a particular embodiment of the invention has been illustrated and described in detail, it will be appreciated that various modifications can be made without departing from the spirit and scope of the invention. Accordingly, the invention is not to be limited, except as by the appended claims.

We claim:

1. In a device for removing dissolved and entrained gas from a liquid, a combination comprising:
    chamber means having inlet means for receiving oil to be degassed and outlet means for discharging degassed oil;
    means for producing a relatively low pressure in said chamber means;
    automatic cycling valve means comprising
        level-actuated means for closing said outlet means at a first location when liquid in said chamber means falls to a certain level, and
        pressure-actuated means independent of said level-actuated means, for closing said outlet means at a second location, opening said outlet means at said first location, and rapidly opening said outlet means at said second location when a preselected increased pressure is reached after closing of said outlet means by said level-actuated means; and
    gas venting means in said chamber means, for releasing separated gas as the liquid level rises after closing of said outlet means;
    whereby said automatic cycling valve means operates automatically to alternatively close and open said outlet means continuously even in industrial and airborne environments.

2. A combination as set forth in claim 1, wherein said means for producing a relatively low pressure includes aspirator means.

3. A cyclic degassing device for removal of unwanted gas contained in a liquid, comprising:
    a degassing chamber having inlet means for admitting liquid containing unwanted gas and outlet means for removing degassed liquid;
    aspirator means for forming a low pressure region in a stream of the liquid;
    cycling valve means for controlling flow of degassed liquid through said outlet means and into said stream, said cycling valve means including
        level-actuated means for closing said outlet means when liquid in said degassing chamber falls to a certain level, and
        pressure-actuated means independent of said level-actuated means for closing said outlet means, for rapidly opening said outlet means when a preselected increased liquid pressure is reached in said degassing chamber when liquid entering through said inlet means fills said chamber; and
    gas venting means automatically operable to vent gas collected in said degassing chamber when a preselected increased gas pressure is reached as liquid fills said chamber, whereby said cycling valve means operates automatically to alternately close and open said outlet means, the collected gas being expelled through said venting means when the liquid level rises in said degassing chamber while said outlet means is closed, and the degassed liquid being drawn from said degassing chamber as the liquid level falls while said outlet means is open.

4. A cyclic degassing device as set forth in claim 3, wherein said inlet means includes means for restricting the flow to a desired rate and for dispersing the liquid into a spray to facilitate separation of gas from the liquid.

5. A cyclic degassing device as set forth in claim 3, wherein said means for closing said outlet means includes:
    a float; and
    sealing means in said outlet means designed to cooperate with said float to close said outlet means as the liquid level falls in said degassing chamber.

6. A cyclic degassing device as set forth in claim 5, wherein:
    said float is generally spherical in shape and is free to float in the liquid in said degassing chamber; and
    said sealing means is a sealing ring of smaller diameter than said float.

7. A cyclic degassing device as set forth in claim 6, further including an open cage mounted on said outlet means to restrain said float from movement outside of said cage.

8. A cyclic degassing device as set forth in claim 3, wherein:
    said means for closing said outlet means operates at a first location in said outlet means; and
    said means for rapidly opening said outlet means includes relief valve means responsive to increasing pressure to seal said output means at a second location, to open said outlet means at said first location, and then to open said outlet means rapidly at said second location.

9. A cyclic degassing device as set forth in claim 8, wherein said relief valve means includes:
    means responsive to closing of said relief valve means, for opening said outlet means at said first location; and
    a relief valve seat and a relief valve closure, at least one of which is movable in response to increased pressure in said degassing chamber to close said relief valve means after said means for closing has closed said outlet means at said first location, and at least one of which is movable in response to further increased pressure to open said outlet means at said second location after said outlet means is opened at said first location.

10. A cyclic degassing device as set forth in claim 3, wherein said gas venting means includes:
    check valve means operable to vent the gas collected in said degassing chamber when the pressure in said chamber slightly exceeds ambient pressure outside of said device; and
    a float chamber with at least one float and at least one pair of seals, said float chamber being operative to prevent substantial liquid flow through said gas venting means.

11. A cyclic degassing device as set forth in claim 3, further including:

connecting means for connecting a liquid reservoir with said degassing chamber and for conveying fluid therebetween;

flow-restricting means in said connecting means, for limiting flow of liquid therein when the reservoir contains no gas, and permitting substantial flow of gas therein when the reservoir contains a pocket of gas;

valve means in said connecting means, for allowing a flow of gas from the reservoir to said degassing chamber unless the pressure of gas in said degassing chamber exceeds a reference pressure; and second flow-restricting means between said valve means and said degassing chamber, for creating a region of increased pressure in said valve means and thereby shutting off flow of gas from the reservoir when it reaches a predetermined rate, whereby gas from the reservoir is drawn into said degassing chamber in small quantities until the pressure in said degassing chamber exceeds the reference pressure.

12. Apparatus as set forth in claim 11, wherein said connecting means includes a housing enclosing a passage leading to said degassing chamber, and said valve means include:

a valve chamber within said housing and communicating with said passage, said valve chamber having a first port connected to the reference pressure and a second port connected to said degassing chamber through said second flow restricting means;

a piston sized to fit said chamber, said piston having a first side exposed to the reference pressure and a second side exposed to the pressure in said degassing chamber, and being movable between an open position and a closed position sealing said passage; and resilient means designed to hold said piston in said closed position so long as the pressure in said degassing chamber exceeds the reference pressure.

13. Apparatus as set forth in claim 11, further including:

gas intake means in said degassing chamber, for removal of high-pressure gas preventing opening of said gas venting means;

third flow-restricting means for limiting the flow of liquid from said degassing chamber through said gas intake means; and means for connecting said gas intake means with said aspirator means.

14. A cyclic degassing device for removal of unwanted gas contained in oil, comprising:

a degassing chamber having inlet means for admitting oil containing unwanted gas;

aspirator means for forming a low pressure region in the stream of the oil;

cycling valve means for controlling flow of degassed oil from said degassing chamber into said stream, said cycling valve means including:

a housing attachable to said degassing chamber and having a cylindrical bore through its length with open upper and lower ends, a generally cylindrical hollow piston sized to sealably slide in said bore and having an open lower end and a closeable upper end with an outlet passage therethrough, first and second retaining means for preventing movement of said piston beyond said upper end of said bore and beyond said lower end of said bore, respectively, first resilient means for urging said piston upwardly against said first retaining means, first sealing means located near the top of said outlet passage, a float, free to move in the oil above said piston and sized to fit said first sealing means and thereby close said outlet passage when the oil falls to a certain level, a post, centrally located in said bore, rigidly attached to said housing, and projecting upwardly in said bore and in said hollow piston, said post having a stop flange at its upper end, a relief valve sleeve sized to slidably fit on said post, said sleeve having an upper flange substantially wider than said outlet passage and being normally spaced below said outlet passage, second resilient means for urging said relief valve sleeve upwardly against said stop flange on said post, and second sealing means for closing said outlet passage with said upper flange on said relief valve sleeve; and gas venting means automatically operable to vent gas collected in said degassing chamber when a preselected increased gas pressure is reached as oil fills said chamber, whereby after said float seals said outlet passage, oil fills said degassing chamber and increasing oil pressure moves both said float and said piston downwardly until said second sealing means closes said outlet passage at its lower end, further increasing pressure moving said float, said piston and said relief valve sleeve together downwardly until said post contacts and unseats said float, and still further increasing pressure moving said relief valve sleeve downwardly with respect to said cylinder, cracking said second sealing means and applying sudden pressure to said upper flange on said relief valve sleeve to positively open said outlet passage.

15. For use with a degassing device, apparatus for removing relatively large quantities of gas from a hydraulic system, said apparatus comprising:

connecting means for connecting a liquid reservoir in the hydraulic system with a low pressure degassing chamber of the degassing device and for conveying fluid therebetween;

flow-restricting means in said connecting means, for limiting flow of liquid in said connecting means when the reservoir contains no gas and permitting substantial flow of gas in said connecting means when the reservoir contains a pocket of gas;

valve means in said connecting means for allowing a flow of gas from the reservoir to the degassing chamber unless the pressure of gas in the degassing chamber exceeds a reference pressure; and second flow-restricting means between said valve means and the reservoir, for creating a region of increased pressure in said valve means and thereby shutting off flow of gas from the reservoir when it reaches a predetermined rate, whereby gas from the reservoir is drawn into the degassing chamber in small quantities until the pressure in the degassing chamber exceeds the reference pressure.

16. Apparatus as set forth in claim 15, further including:

gas intake means in the degassing chamber, for removal of any accumulation of high-pressure gas preventing normal operation of the degassing device;

third flow-restricting means, for limiting liquid flow from the degassing chamber through said gas intake means; and means for connecting said gas intake means with a low pressure region in the degassing device.

17. Apparatus as set forth in claim 15, wherein said connecting means includes a housing enclosing a passage leading to the degassing chamber, and said valve means include:

a valve chamber within said housing and communicating with said passage, said valve chamber having a first port connected to the reference pressure and a second port connected to the degassing chamber through said second flow-restricting means;

a piston sized to fit said valve chamber, said piston having a first side exposed to the reference pressure and a second side exposed to the degassing chamber pressure, and being movable between an open position and a closed position sealing said passage; and resilient means designed to hold said piston in said closed position so long as the pressure in the degassing chamber exceeds the reference pressure.

18. Apparatus as set forth in claim 17, wherein said valve means further include:

first and second seals between said valve chamber and said piston, said passage from the reservoir entering said valve chamber at a point intermediate said first and second seals, and said seals being slightly different in size;

whereby gas entering through said passage exerts a net force on said piston because of the difference in seal sizes, and the net force is just sufficient to overcome said resilient means and thereby open said valve means when the pressure in the degassing chamber is equal to the reference pressure.

* * * * *

UNITED STATES PATENT AND TRADEMARK OFFICE
CERTIFICATE OF CORRECTION

PATENT NO. : 3,969,092
DATED : July 13, 1976
INVENTOR(S) : John A. Huffman & Vincent G. Magorien It is certified that error appears in the above-identified patent and that said Letters Patent are hereby corrected as shown below:

Column 1, line 12, "pumps" should be -- pump --.

Column 2, line 35, "low certain" should be -- predetermined low --.

Column 3, line 9, "resevoir" should be -- reservoir --; line 53, "FIG. 10" (second occurrence) should be -- FIG. 9 --.

Column 4, line 6, "as usual" should be -- as is usual --.

Column 6, line 4, "sleeve 59" should be -- sleeve 58 --.

Column 9, line 42, "alternatively" should be -- alternately --.

Signed and Sealed this

Twenty-sixth Day of October 1976

[SEAL]

Attest:

RUTH C. MASON
Attesting Officer

C. MARSHALL DANN
Commissioner of Patents and Trademarks